United States Patent [19]

Bichelmeyer

[11] Patent Number: 5,429,547

[45] Date of Patent: Jul. 4, 1995

[54] SAUSAGE FORMING REEL

[76] Inventor: Garry R. Bichelmeyer, P.O. Box 712, DeSoto, Kans. 66018

[21] Appl. No.: 202,449

[22] Filed: Feb. 28, 1994

[51] Int. Cl.$^6$ .................... A22C 11/00; A22C 15/00
[52] U.S. Cl. ........................ 452/51; 450/186
[58] Field of Search .................... 452/51, 186, 185

[56] References Cited

U.S. PATENT DOCUMENTS

| 2,308,740 | 1/1943 | Bogner | 452/51 |
| 2,592,939 | 4/1952 | Miller | 452/186 |
| 2,780,831 | 2/1957 | Harman | 452/186 |
| 3,233,281 | 2/1966 | Swift | 452/48 |
| 4,339,846 | 7/1982 | Zamiara | 452/51 |
| 5,306,204 | 4/1994 | Smith et al. | 452/51 |

*Primary Examiner*—Willis Little
*Attorney, Agent, or Firm*—Chase & Yakimo

[57] ABSTRACT

A sausage reel includes first and second end plates with a plurality of support bars extending therebetween. The bars are releasably fastened between the end plates in either first or second arrays. A continuous sausage is wound about the entire selected array with the reel then placed in a smoker oven. Upon removal of the reel from the cooker a knife is guided along each bar to present a plurality of sausage links having a length corresponding to the distance between adjacent bars of the selected array. The releasable fastening of the bars in extension between the end plates allows the user to vary the size and/or configuration of the bar array so as to vary the length of the sausage links. The reel is rotatable within a stand to enhance the initial winding of the sausage about the array as well as subsequent cutting of the sausage links therefrom.

9 Claims, 3 Drawing Sheets

SAUSAGE FORMING REEL

BACKGROUND OF THE INVENTION

This invention relates to a smoke rack, and more particularly, to a variable reel for forming and cooking beef sticks and/or sausages of user-selectable lengths thereon.

Various methods are known to form sausage links before cooking. In some cases this operation includes measuring a link of the sausage and stuffing the sausage casing by hand. Obviously such method is a slow one and leads to variations in the lengths of the sausage links. Once such links are formed, they are then transported to an oven for smoking/cooking.

Devices have been utilized to form sausage links and support the links thereon for cooking. However, such devices, as shown in the Miller patent, U.S. Pat. No. 2,592,939, and/or the Harmon patent, U.S. Pat. No. 2,780,831 do not provide means for varying the sausage lengths and then efficiently cook the same.

In response thereto I have invented a sausage reel which enables the user to efficiently wind a continuous uniform sausage about the reel and form the wound sausage into defined lengths for subsequent cooking. Subsequent to cooking a plurality of sausages of the defined lengths are then cut from the reel. My device enables the user to efficiently form and cook sausages of various lengths without degradation of the smoking-/cooking efficiency.

Generally, my device comprises first and second end plates having a plurality of releasable bars extending therebetween to form a bar array. Upon rotation of the reel within a support stand a continuous sausage is wound about the support bar array with the adjacent bars defining the opposed ends of a portion of the sausage extending therebetween. The reel is then placed in an oven or smoke truck for subsequent cooking. Upon removal the bars serve as end guides for cutting the ends of the wound sausage portions to present links. The bars are releasably mounted between the plates to allow for user-selectable spacing of the bars. Thus at least first and second reels can be alternatively presented. Each reel presents a bar array having a user-selectable distance between adjacent bars of the bar array. Such distances correspond to user selectable lengths of the sausage portion extending therebetween.

It is therefore a general object of this invention to provide a device which efficiently forms and smokes a plurality of beef sticks or sausage links.

Another object of this invention is to provide a device, as aforesaid, which presents first or second sausage reels as presented by a releasable support bar array.

A further object of this invention is to provide a sausage reel, as aforesaid, which is easily used with a conventional smoker oven.

Still another object of this invention is to provide a sausage reel, as aforesaid, which allows the user to easily cut a continuous sausage wound about the reel into a plurality of sausage links.

A still more particular object of this invention is to provide a sausage reel, as aforesaid, which allows the user to change the configuration of a support bar array and the length of the resulting sausage links.

Still a further object of this invention is to provide a sausage reel, as aforesaid, which is rotatable within a stand so as to enhance winding of a continuous sausage around the reel.

Another object of this invention is to provide a sausage reel, as aforesaid, which allows for even heat and smoke penetration onto the sausage wound around the reel.

Another particular object of the invention is to provide a sausage reel, as aforesaid, which provides guide means for a cutting edge to sever the smoked sausage into a plurality of fixed sausage links.

Other objects and advantages of this invention will become apparent from the following description taken in connection with the accompanying drawings wherein are now set forth by way of illustration and example a now preferred embodiment of this invention.

DESCRIPTION OF THE PREFERRED EMBODIMENT

Figure 1:
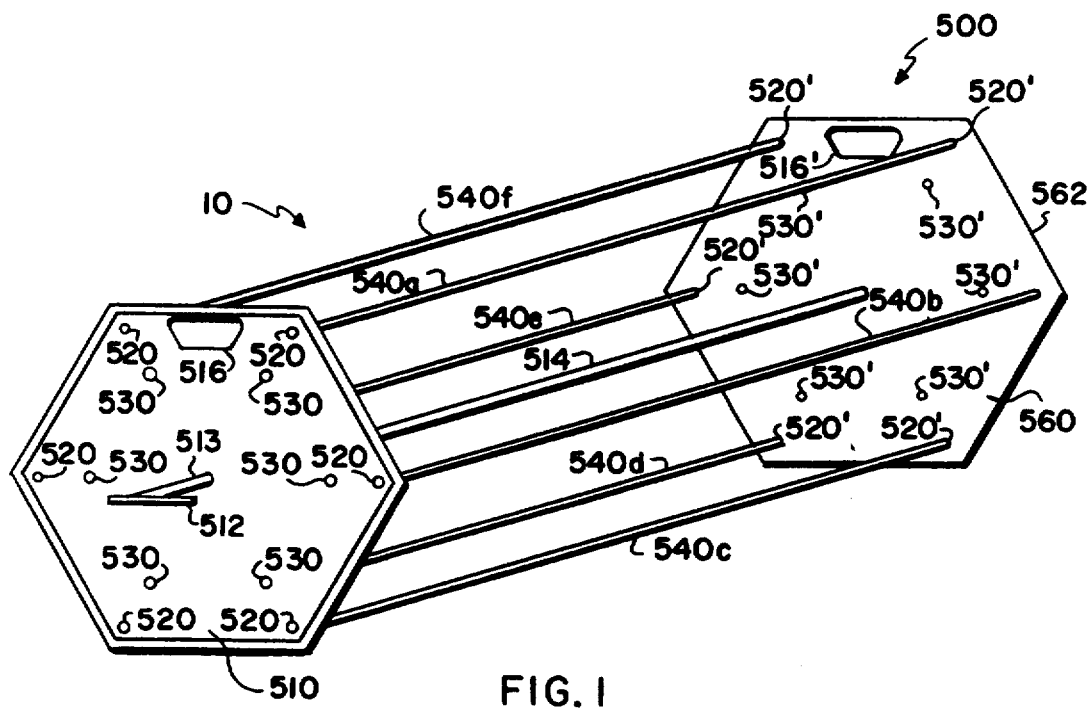
FIG. 1 a perspective view of the sausage reel.
Figure 2:
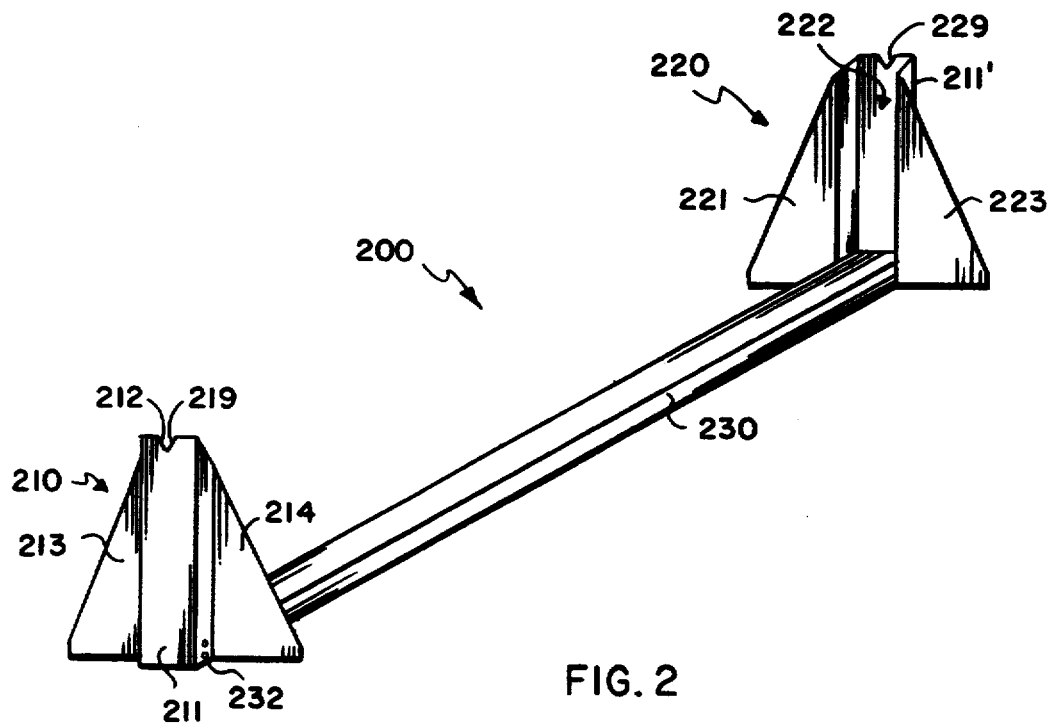
FIG. 2 a perspective view of the support stand for the sausage reel.
Figure 3:
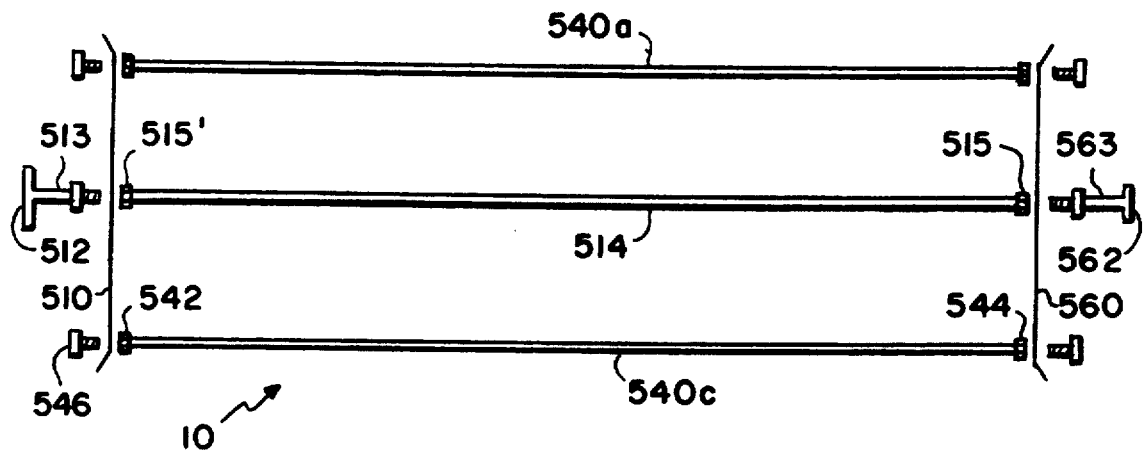
FIG. 3 is a top/side exploded diagrammatic view of the sausage reel showing the extension of the support bars between the longitudinally spaced-apart end plates.
Figure 4:
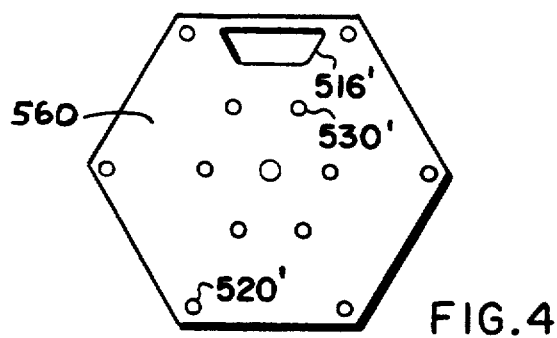
FIG. 4 is an end view of one end plate of the sausage reel.
Figure 5:
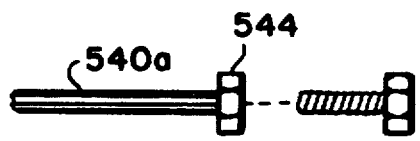
FIG. 5 is a view of an end of a support bar with a fastening bolt exploded therefrom.

Turning more particularly to the drawings, the sausage reel 10 is shown as generally comprising a support stand 200 and a reel assembly 500 releasably mounted to the support stand 200.

The stand 200 comprises a pair of supports 210, 220 with a channel-iron base 230 extending therebetween. The base 230 is slidably received within slots 212, 222 within the vertical posts 211, 211'. The ends of the base 230 are attached thereto by nut bolt combinations 232. Wings 213, 214 and 221, 223 extend from each central post 211, 211' to provide stability thereto. Atop each central post 210, 220 is a V-shaped notch 219, 229 for reception of the axles 513, 563 of handles 512, 562 of the reel assembly 500 therein.

As shown in FIG. 1, the now preferred reel 500 comprises first and second hexagonal end plates 510, 560. Within each plate 510, 560 are notches 516, 516' for gripping by the user during reel 500 transportation.

A central bar 514 extends between the center points of plates 510, 560 and thus defines an imaginary, central longitudinal axis. Bar 514 has nuts 515, 515' at the bar ends for threadably receiving the threaded ends of handles 512, 562 therein. The axle 513, 563 of handles 512, 562 rest in the above described support stand notches 219, 229 and are rotatable therein.

Within each congruent plate 510, 560 are positioned a plurality of congruent apertures 520, 520' and 530, 530'. Each corresponding aperture 520, 520' is positioned adjacent each corner of the hexagonal plate 510, 560 and is equidistant from the center point of each end plate 510, 560. A second array of corresponding apertures 530, 530' is inwardly displaced from each aperture 520, 520'. Each aperture is positioned along a radius extending between the center point and corner of each congruent end plate 510, 560.

The plurality of sausage support bars in the form of tubes 540a, 540b, 540c, 540d, 540e, 540f extend between either the first array of corresponding apertures 520, 520' or second array of corresponding apertures 530, 530' found in each plate 510, 560. Each tube presents a nut 542, 544 welded at its opposed ends which releasably receives a threaded bolt 546 thereon. The bolts 546 are threaded to each respective end 542, 544 with the respective plates 510, 560 secured therebetween. Accordingly, a plurality of spaced apart parallel bars 540a–540f extend between the plates 510, 560 and about the central axis as defined by bar 514. This hexagonal bar array presents a supporting framework or reel for wrapping a continuous sausage therearound.

Figure 7:
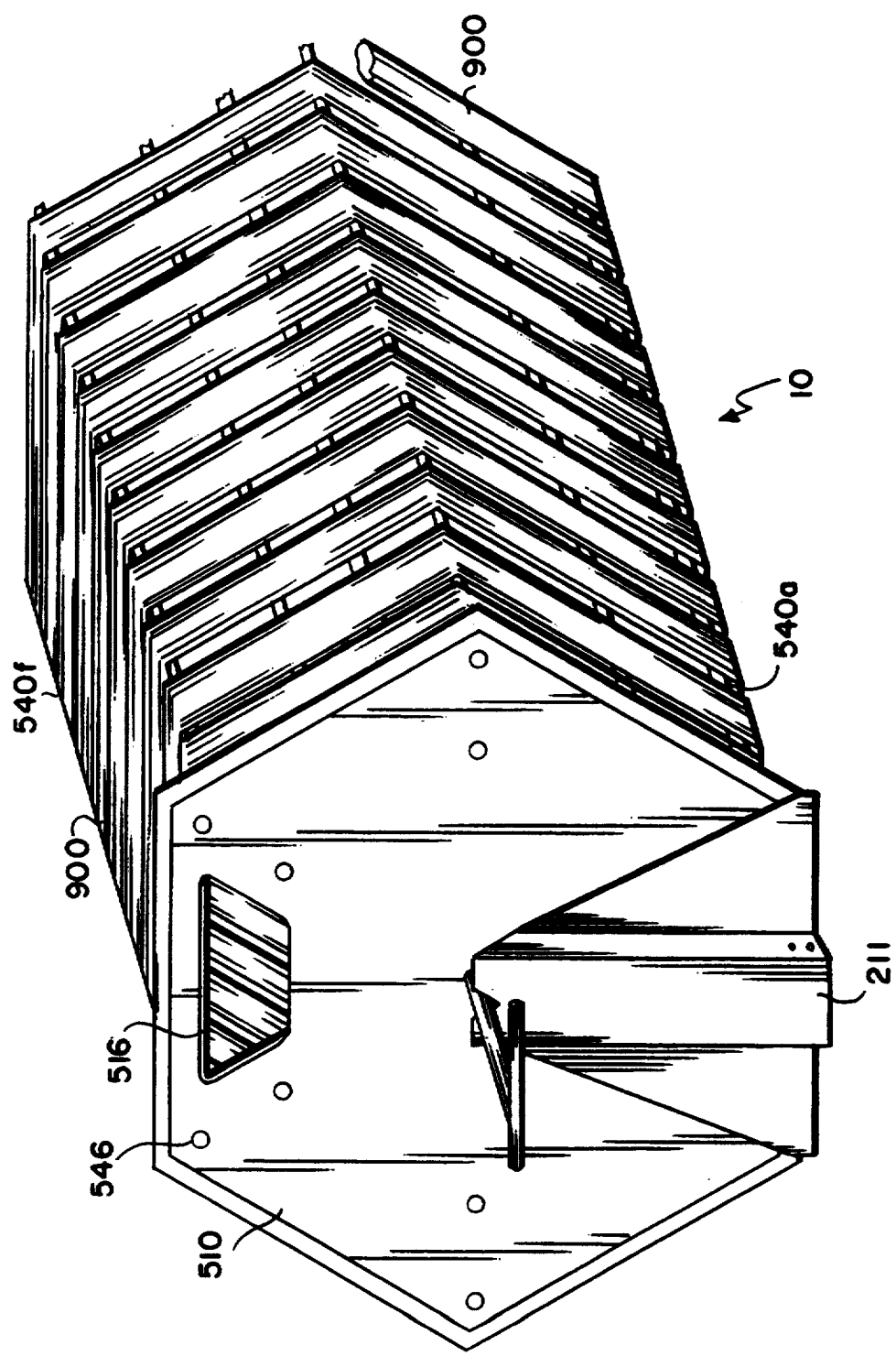
FIG. 7 is a partial fragmentary view, on an enlarged scale, showing a continuous sausage wrapped about a portion of the bar array of a sausage reel.

In use a first end of a continuously straight-stuffed sausage 900, as presented by a machine or the like, is placed on an end of one of the bars, e.g. 540a, adjacent one of the base plates 510. The user clips this end to bar 540a and then winds this continuous sausage about the tube array 540a–540f. This winding process is enhanced by the ability of the user to rotate the reel 500 within the support stand 200 as provided by rotation of the handle axles 513,563 within the respective notches 219, 229. The reel 500 is continuously rotated within support stand 200 such that the straight sausage is continuously wound about the bar array from plate 510 to plate 560 (FIG. 7). During this process the portions of the sausage adjacent each bar are depressed by the user to enhance a purchase of the sausage with the bars of the underlying reel 500. Clips are placed at the respective ends of the continuous sausage, adjacent the end plates 510, 560, so as to hold the ends of the sausage 900 thereto.

Once the sausage is wound about reel 500, the reel 500 is lifted off its support stand 200 by using grips 514, 516. The reel 500 is transported in its entirety to a smoke oven. The bar array, hexagonal as shown, allows for even heat and smoke penetration to penetrate throughout the length of the reel 500 and onto the sausage 900 wound therearound.

Upon completion of the cooking process, the reel 500 is removed from the oven and placed in the support stand 200 atop a table or the like. The user then takes a sharp knife and directs the knife along a bar, e.g. 540a, so as to slice through the depressed portions of the sausage adjacent the chosen bar. These depressed portions define ends of a sausage link. The passage of the knife along the chosen bar cuts through all the depressed ends adjacent the chosen bar and thus presents free sausage ends. This cutting process is repeated along each adjacent bar. Upon completion, a plurality of sausage links having fixed lengths as generally determined by the normal distance between the adjacent bars of the selected reel 500 array are presented.

If sausages of a smaller length are desired the bars 540a–540f are extended between the inner aperture array 530, 530' and fastened to the end plates 510, 560 by bolts 546. Accordingly, a second hexagonal bar array having a plurality of spaced apart bars arranged about the central axis 514 is presented. This array presents a normal distance between adjacent bars less than the distance between adjacent bars of the first array. The continuous sausage can then be wound about this second array, cooked and then cut as above-described. Thus the lengths of the resulting sausage links are smaller than those of the first array due to the reduced distance between adjacent bars 540a–540f of the bar array.

Figure 6:
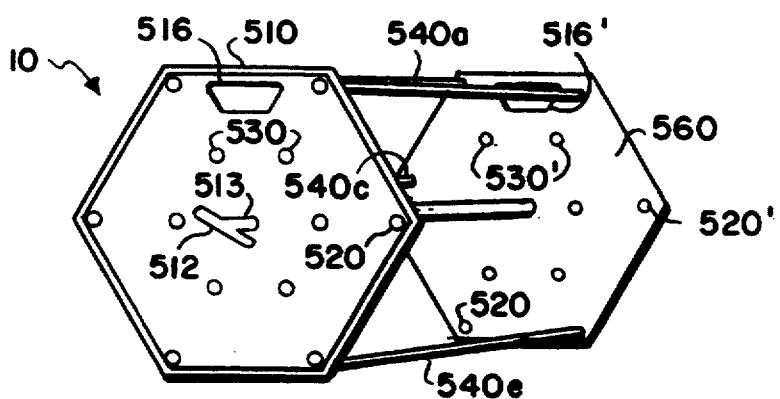
FIG. 6 is a perspective view, on a reduced scale, or the sausage reel with selected bars removed to present a new support bar array.

It is also understood that alternative bars may be removed from the bar array. As shown in FIG. 6, bars 540b, 540d and 540e have been removed. Thus a triangular bar array is presented. Upon winding the sausage 900 about this array sausage links of greater length are produced. Accordingly, the length of the sausages may be selectably increased or decreased according to the utilized bar array.

As can be appreciated, the ability of the user to alternatively mount the bars 540a–540f in various arrays between the plates 510, 560, allows the user to produce sausage links of various lengths. Accordingly, although only two sets of apertures forming a hexagonal array in the end plates 510, 560 are shown, it is understood that various other aperture arrays can be used to present other bar configurations. As such it is appreciated that the pattern of corresponding apertures in each end plate 510, 560 defines the configuration of the resulting bar array. Accordingly, indicia other than apertures may be used on the end plates to direct the ends of the support bars to positions on the end plates for connection thereto by alternative fasteners.

Although a form of this invention has been illustrated and described, it is understood that it is not to be limited thereto except as set forth in the following claims and allowable functional equivalents thereof.

Having thus described the invention, what is claimed as new and desired to be secured by Letters Patent is as follows:

1. A reel for forming a plurality of sausage links of user selectable lengths comprising:

first and second longitudinally spaced apart polygonal end plates having at least three vertices with an imaginary longitudinal axis extending therebetween;

a plurality of support bars having first and second free ends for winding a continuous sausage therearound;

a plurality of first means associated with said end plates for releasably mounting said bars in longitudinal extension between said first and second end plates, said first mounting means fixed at selected vertices of each end plate, said mounted bars extending between said first mounting means for presenting a first bar array about the imaginary longitudinal axis, said first bar array presenting said bars spaced apart at a first distance;

a plurality of discrete second means associated with said end plates for releasably mounting said bars in longitudinal extension between said first and second end plates, said second mounting means fixed at a position displaced from said first releasable mounting means, said mounted bars extending between said second mounting means for presenting an alternative user selectable second array about the imaginary longitudinal axis, said second bar array presenting said bars spaced apart at a second distance different than said first distance, said alternative arrays presenting said reel for winding a sausage therearound for use in a cooking oven, said bars defining the ends of a portion of the continuous sausage extending between adjacent bars, said ends defining the length of a sausage link resulting from passage of a cutting edge along each of said bars in said bar array, the length of each sausage link corresponding to said distance between said adjacent bars of a selected first or second bar array.

2. The device as claimed in claim 1, wherein said first and second bar mounting means comprises:

a plurality of first apertures fixed in said first end plate at said vertices and positioned about the imaginary axis;

a plurality of discrete second apertures fixed in said second end plate at said vertices and corresponding to said first apertures, said first and second apertures comprising a part of said first bar mounting means;

a plurality of third apertures fixed in said first end plate and radially displaced from said plurality of first apertures;

a plurality of fourth apertures fixed in said second end plate and radially displaced from said plurality of second apertures and corresponding to said third apertures, said third and fourth apertures comprising a part of said second bar mounting means; and means for releasably fastening each bar end to a respective end plate aperture whereupon an array of bars extends between each end plate, said first array corresponding to bars extending between said first and second apertures with said second bar array corresponding to bars extending between said third and fourth apertures.

3. The device as claimed in claim 2, wherein said fastening means comprises:

means at each bar end for releasably receiving a threaded bolt therein; and a threaded bolt extending through each aperture and into said receiving means, whereby to connect said bolt to said bar with said end plate therebetween.

4. The device as claimed in claim 3, wherein said receiving means comprises a threaded nut at each bar end for receiving said bolt.

5. The device as claimed in claim 1 further comprising:

a support stand having first and second longitudinally spaced apart support posts; and means for rotatably mounting said reel within said support stand, whereupon rotation of said reel enhances said user-winding of said sausage therearound.

6. The device as claimed in claim 5, wherein said rotatable mounting means comprises:

a notch atop each support post; and an axle extending from each of said end plates and rotatable within each notch.

7. The device as claimed in claim 1 wherein a support bar is extended between less than said full complement of first or second bar mounting means whereby to present a third bar array having bars therein spaced apart at different distances therebetween than said first or second bar arrays.

8. The device as claimed in claim 1 further comprising a plurality of bars extending between both first and second bar mounting means whereby to present a first bar array surrounding a second bar array.

9. A reel for forming a plurality of sausage links of user-selectable lengths comprising:

first and second longitudinally spaced apart hexagonal end plates presenting at least six vertices;

a plurality of support bars having first and second ends for winding a continuous sausage therearound;

a plurality of corresponding first apertures in each end plate at the vertices of each end plate;

a plurality of corresponding second apertures in each end plate displaced from said first apertures along a radius extending between a center of each end plate and a vertex thereof; and means for releasably fastening each support bar end between either said corresponding end plate first apertures or said corresponding end plate second apertures, said fastening presenting either a first array or second array of support bars extending between said end plates, the adjacent bars of each array defining the ends of a portion of a sausage wound about the entire selected array, whereby passage of a cutting edge along each bar of said array forms sausage links of a length corresponding to said sausage portion.

* * * * *